United States Patent
Staroselsky et al.

(10) Patent No.: US 9,932,841 B2
(45) Date of Patent: Apr. 3, 2018

(54) WORKPIECE MANUFACTURED FROM AN ADDITIVE MANUFACTURING SYSTEM HAVING A PARTICLE SEPARATOR AND METHOD OF OPERATION

(71) Applicant: United Technologies Corporation, Farmington, CT (US)

(72) Inventors: Alexander Staroselsky, Avon, CT (US); Sergey Mironets, Charlotte, NC (US); Thomas N. Slavens, Moodus, CT (US); Thomas J. Martin, East Hampton, CT (US); Brooks E. Snyder, Dartmouth (CA)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/109,001

(22) PCT Filed: Jan. 16, 2015

(86) PCT No.: PCT/US2015/011797
§ 371 (c)(1),
(2) Date: Jun. 29, 2016

(87) PCT Pub. No.: WO2015/109214
PCT Pub. Date: Jul. 23, 2015

(65) Prior Publication Data
US 2016/0319678 A1    Nov. 3, 2016

Related U.S. Application Data

(60) Provisional application No. 61/928,786, filed on Jan. 17, 2014.

(51) Int. Cl.
*F01D 5/28* (2006.01)
*B33Y 10/00* (2015.01)
(Continued)

(52) U.S. Cl.
CPC ............ *F01D 5/282* (2013.01); *B22F 3/1055* (2013.01); *B22F 5/04* (2013.01); *B23K 15/0086* (2013.01);
(Continued)

(58) Field of Classification Search
CPC . F01D 5/282; F01D 5/147; F01D 5/18; B29C 67/0085; B29C 67/0077;
(Continued)

(56) References Cited

U.S. PATENT DOCUMENTS 5,558,832 A    9/1996 Noel et al.
2006/0165546 A1    7/2006 Yamada et al.
(Continued)

OTHER PUBLICATIONS

EP search report for EP15736998.4 dated Jan. 30, 2017.

*Primary Examiner* — Moshe Wilensky
(74) *Attorney, Agent, or Firm* — O'Shea Getz P.C.

(57) ABSTRACT

A workpiece manufactured from an additive manufacturing system (AMS) having a particle separator and a method of operating includes modeling the workpiece into layers and modeling the layers into a plurality of regions. The AMS then deposits one of a plurality of particle types into a respective one of the plurality of regions. In this way, the surface finishes of the component may be controlled and material densities from one region to the next and from one layer to the next are also controlled.

14 Claims, 6 Drawing Sheets

(51) Int. Cl.
  *B33Y 80/00* (2015.01)
  *B22F 3/105* (2006.01)
  *B22F 5/04* (2006.01)
  *B23K 26/342* (2014.01)
  *B23K 15/00* (2006.01)
  *F01D 5/14* (2006.01)
  *B29C 64/153* (2017.01)
  *B29C 64/20* (2017.01)
  *F01D 5/18* (2006.01)
  *B23K 101/00* (2006.01)

(52) U.S. Cl.
  CPC .......... *B23K 26/342* (2015.10); *B29C 64/153* (2017.08); *B29C 64/20* (2017.08); *B33Y 10/00* (2014.12); *B33Y 80/00* (2014.12); *F01D 5/147* (2013.01); *F01D 5/18* (2013.01); *B23K 2201/001* (2013.01); *F01D 5/187* (2013.01); *F05D 2220/30* (2013.01); *F05D 2230/30* (2013.01); *F05D 2230/31* (2013.01); *F05D 2260/221* (2013.01); *F05D 2300/10* (2013.01); *F05D 2300/5024* (2013.01); *Y02P 10/295* (2015.11)

(58) Field of Classification Search
  CPC ..... B23K 26/342; B23K 15/0086; B22F 5/04; B22F 3/1055; B33Y 80/00; B33Y 10/00
  See application file for complete search history.

(56) References Cited

U.S. PATENT DOCUMENTS

| | | |
|---|---|---|
| 2007/0116556 A1 | 5/2007 | Mons et al. |
| 2007/0202351 A1 | 8/2007 | Justin et al. |
| 2011/0287185 A1 | 11/2011 | Felstead et al. |
| 2011/0311389 A1* | 12/2011 | Ryan .................... B22F 3/1055 419/27 |
| 2013/0015609 A1 | 1/2013 | Landau |
| 2013/0195673 A1 | 8/2013 | Godfrey et al. |
| 2014/0015172 A1 | 1/2014 | Sidhu et al. |

* cited by examiner

WORKPIECE MANUFACTURED FROM AN ADDITIVE MANUFACTURING SYSTEM HAVING A PARTICLE SEPARATOR AND METHOD OF OPERATION

This application claims priority to PCT Patent Application No. PCT/US15/011797 filed Jan. 16, 2015 which claims priority to U.S. Patent Application No. 61/928,786 filed Jan. 17, 2014, which are hereby incorporated herein by reference in their entireties.

BACKGROUND

The present disclosure relates to an additive manufacturing system and, more particularly, to a workpiece manufactured by the additive manufacturing system having a particle separator and method of operation.

Traditional additive manufacturing systems (AMS) include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of turbine components, layer-by-layer. The principle behind additive manufacturing processes involves the selective melting of atomized precursor powder beds by a directed energy source, producing the lithographic build-up of the workpiece 60. The melting of the powder occurs in a small localized region of the energy beam, producing small volumes of melting, called melt pools, followed by rapid solidification, allowing for very precise control of the solidification process in the layer-by-layer fabrication of the workpiece 60. These devices are directed by three-dimensional geometry solid models developed in Computer Aided Design (CAD) software systems. The strategy of the scanning, power of the energy beam, residence time or speed, sequence of melting are directed by the embedded CAD system.

Significant effort is needed to improve the speed of additive manufacturing systems so that they can become a cost effective option to castings, and to improve the quality because AMS produced workpiece 60s suffer from several deficiencies resulting in poor material characteristics, such as porosity, melt ball formations, layer delamination, and uncontrolled surface coarseness and material compositions. The AMS is useful in manufacturing complex and detailed workpieces. Unfortunately, such workpieces often require smooth surfaces for efficient operation not producible using an AMS; thus, additional, time consuming, and expensive machining or other more conventional steps may be required. Moreover, such surfaces may be internal and not accessible for machining In addition, many workpieces are under internal stresses during operation that limit surrounding environment exposure to heat and/or pressure. To address such stress concerns, it is desirable to change material densities or compositions at pre-selected locations in the workpiece thus making the workpiece less susceptible to the negative effects of the surrounding environment. Unfortunately, known AMS's are not capable of manufacturing such composition variances in a single workpiece.

SUMMARY

A method of operating an additive manufacturing system according to one non-limiting embodiment of the present disclosure includes the steps of selecting a layer of a workpiece; separating the layer into a plurality of regions; depositing one of a plurality of particle types into a respective one of the plurality of regions; and melting the regions having the plurality of particle types.

In a further embodiment of the foregoing embodiment, the region is melted with an energy gun.

In an alternative or additionally thereto, in the foregoing embodiment a further step includes depositing a small particle type of the plurality of particle types in a first surface region of the plurality of regions for a smooth surface finish.

In an alternative or additionally thereto, in the foregoing embodiment a further step includes depositing a large particle type of the plurality of particle types in an interior surface region of the plurality of regions for a coarse surface finish.

In an alternative or additionally thereto, in the foregoing embodiment the workpiece is an airfoil and the interior surface region defines a cooling channel in the airfoil and the first surface region is an exterior surface of the airfoil.

In an alternative or additionally thereto, in the foregoing embodiment the airfoil is of a turbine blade.

In an alternative or additionally thereto, in the foregoing embodiment a further step includes separating the plurality of particle types utilizing a particle separator.

In an alternative or additionally thereto, in the foregoing embodiment further steps include entraining a mixed powder in an airflow of the particle separator, and separating the mixed powder into the plurality of particle types by weight ranges.

In an alternative or additionally thereto, in the foregoing embodiment further steps include separately controlling the flow of each one the plurality of particle types into a spreader, and controllably dispensing each one of the plurality of particle types onto a build table.

In an alternative or additionally thereto, in the foregoing embodiment a laser gun melts the layer.

In an alternative or additionally thereto, in the foregoing embodiment an electron beam gun melts the layer.

In an alternative or additionally thereto, in the foregoing embodiment the build table is constructed and arranged to move in a z-coordinate direction and the energy gun is constructed and arranged to melt the layer, region-by-region, in an x-y coordinate plane.

An additive manufactured workpiece according to another non-limiting embodiment of the present disclosure has a varying material composition.

In a further embodiment of the foregoing embodiment the varying composition has a varying density.

In an alternative or additionally thereto, in the foregoing embodiment the varying composition has varying constituents.

In an alternative or additionally thereto, in the foregoing embodiment the workpiece has a surface manufactured of a particle type having a small particle size for a smooth surface finish.

In an alternative or additionally thereto, in the foregoing embodiment a surface of the workpiece defines an interior cavity, and the surface is manufactured of a pre-determined particle type for establishing a pre-determine surface finish.

In an alternative or additionally thereto, in the foregoing embodiment the varying composition has a small-size particle type for a high density and a large-size particle type for a low density.

In an alternative or additionally thereto, in the foregoing embodiment the workpiece is a turbine blade including a root end and a distal tip, and wherein the varying density decreases as the blade extends from the root end to the distal tip.

In an alternative or additionally thereto, in the foregoing embodiment the workpiece is a turbine airfoil, the interior cavity is a cooling channel, and the second surface is manufactured of a particle type having a large particle size for a rough surface finish to enhance heat transfer.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
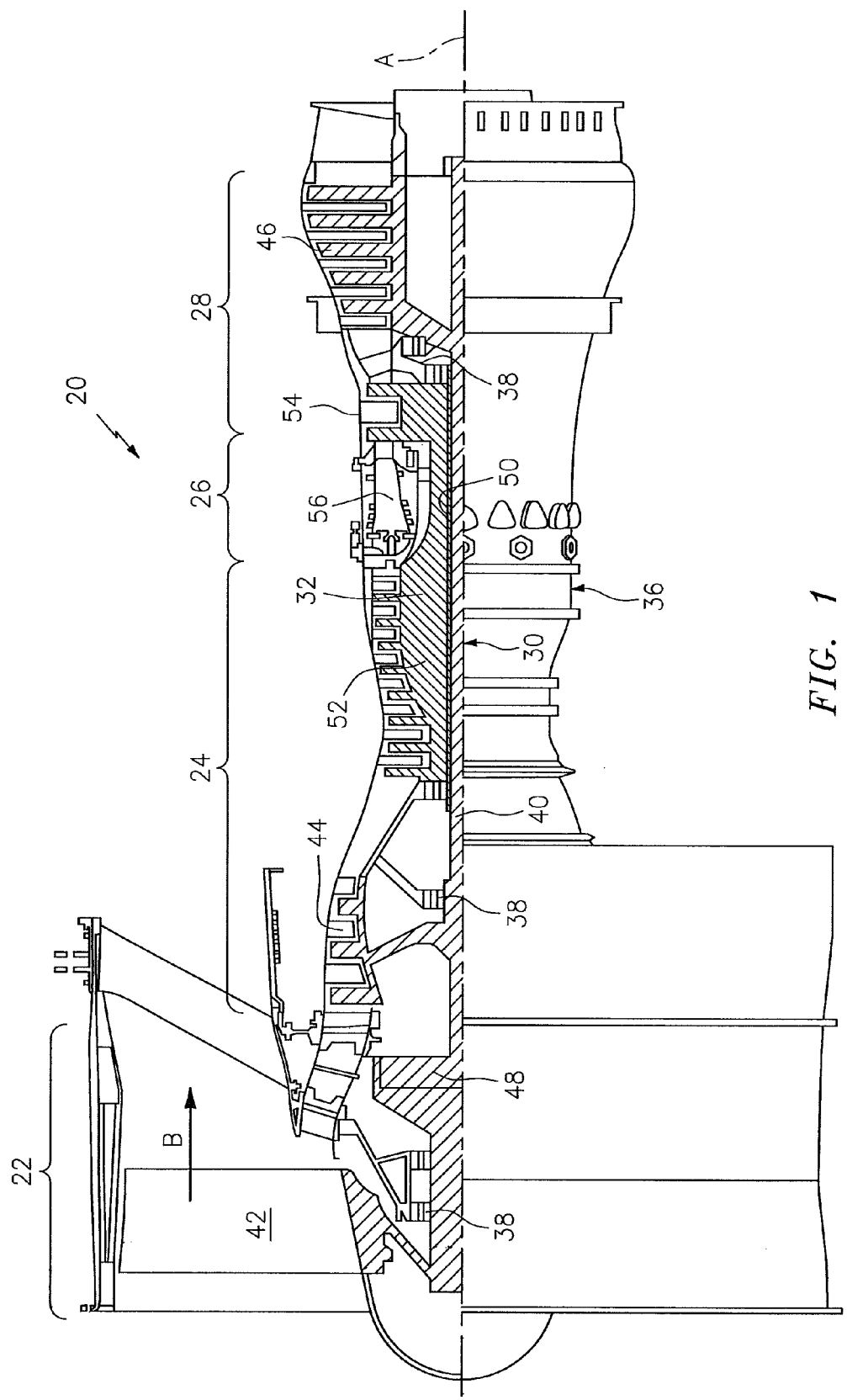
FIG. 1 is a schematic cross section of a turbine engine including multiple, non-limiting examples of workpieces.

FIG. 1 schematically illustrates a gas turbine engine 20 that includes many non-limiting examples of workpieces capable of being manufactured by the additive manufacturing system of the present disclosure. The engine 20 is disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
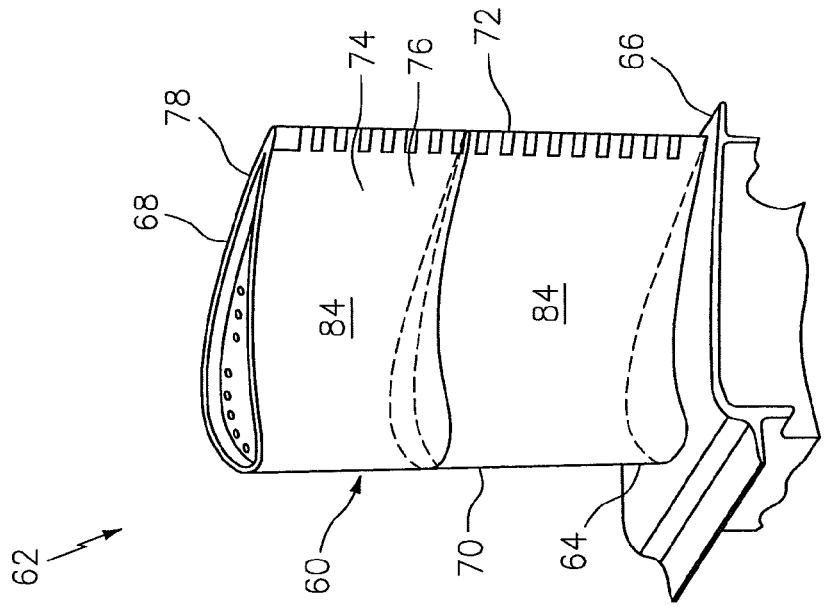
FIG. 2 is a perspective view of a turbine blade of the turbine engine as one non-limiting example of a workpiece.
Figure 3:
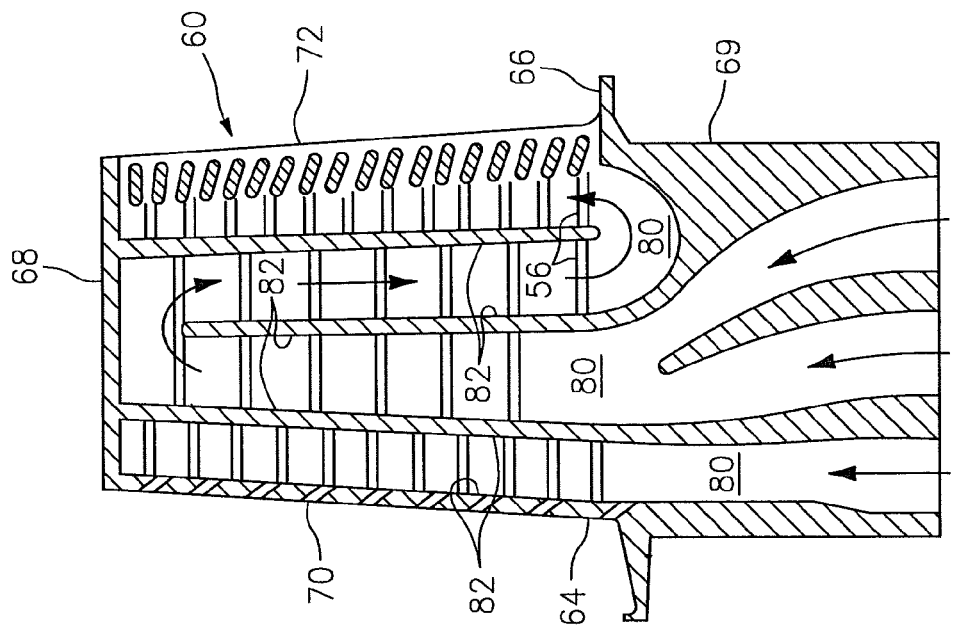
FIG. 3 is a cross section of the workpiece.

Referring to FIGS. 2 and 3, the gas turbine engine 20 includes a wide variety of complex structures or workpieces 60 that are typically manufactured utilizing a series of expensive and time consuming processes including casting and machining Examples of such workpieces 60 are airfoils utilized in the LPC 44, HPC 52, LPT 46 and HPT 54 as both stationary vanes and rotating blades. Other gas turbine engine examples may include, but are not limited to, BOAS, combustor panels and turbine rotors. In FIG. 2, a blade 62 is illustrated having the workpiece or airfoil 60 (as one non-limiting example) that projects radially outward, with respect to axis A, from a root 64 attached to a platform 66 of the blade 62, and to a tip 68 of the airfoil 60. The platform 66 may removably secure to a rotating disc via a fir tree 69. The airfoil 60 further has a leading edge 70, a trailing edge 72 (with respect to rotation), and an exterior surface 74, all spanning between the platform 66 and the tip 68. The exterior surface 74 includes a pressure side 76 and an opposite suction side 78 spanning between the leading and trailing edges 70, 72. The exterior surface 74 has a smooth surface finish for efficient flow of air and operation of the turbine engine 20. The airfoil 60 further includes interior cooling channels or cavities 80 defined by an interior surface 82 for cooling of the airfoil workpiece. The interior surface 82 may have a rough or coarse surface finish for heat transfer efficiency. It is further understood and contemplated that other examples of workpieces 60 may include interior cavities 80 that do not flow any medium and wherein a smooth interior surface is desired.

The workpiece or airfoil 60 may have a plurality of layer portions 84 that may be generally stacked in a radial direction (with respect to how the airfoil is positioned in the engine 20) and congruently formed to one-another as one piece. Each respective one of the plurality of layer portions 84 may have a different material composition such as element constituents thereby foaming a different material alloy from one layer to the next or different material densities, or both. It is further understood and contemplated that the workpiece 60 may take any form and may have a plurality of layer portions 84 stacked in a singular direction and thus not limited to a "radial direction."

In the present non-limiting example, the material density of the airfoil 60 is greater at the root 64 than at the tip 68. More specifically, about the outer fifty percent of airfoil span has a density less than the inner fifty percent of span. This difference in density reduces stress at the root produced by blade pull. This reduction in stress enables the primary benefit of increased rotor speed, as well as a secondary benefit of a reduction in cooling requirements while still meeting blade integrity and service life requirements. An increase in rotor speed and the reduction in cooling requirements increase the overall engine performance and efficiency.

Figure 4:
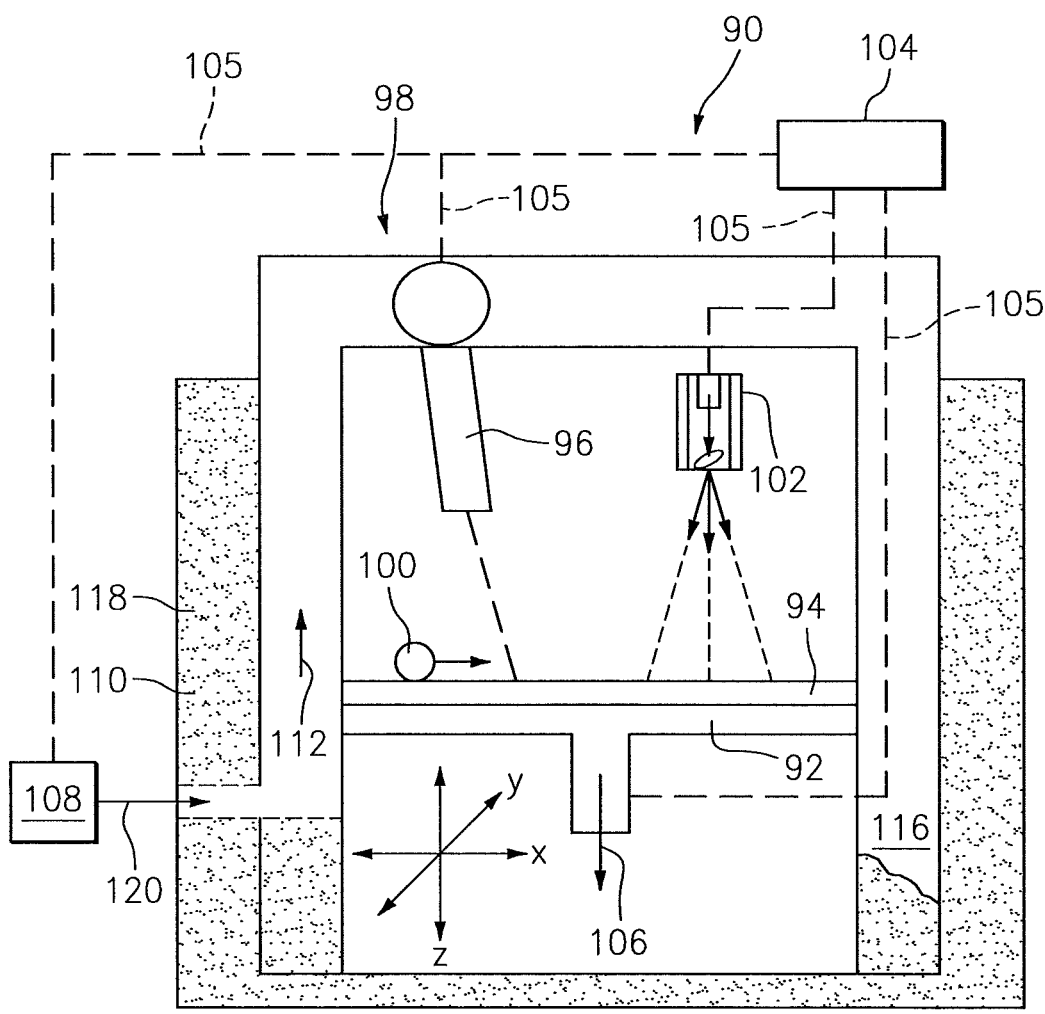
FIG. 4 is a schematic view of an additive manufacturing system utilized to manufacture the workpiece.

FIG. 4 schematically illustrates an AMS 90 capable of manufacturing the complex workpieces or airfoils 60 of the gas turbine engine 20 having specific surface finish requirements and variable material composition requirements. The AMS 90 may have a build table 92 for holding a powder bed 94, a particle spreader 96 for producing the powder bed 94, an aerodynamic particle separator 98 for controllably supplying separated particles to the spreader 96, a roller or wiper 100 for compressing the powder bed, an energy gun 102 for selectively melting regions of the powder bed, and a controller 104 for controlling the various operations of the components. The system 90 is constructed to build the workpiece 60 in a layer-by-layer process. The build table 92 is thus constructed to move along a substantially vertical z-coordinate, as generally illustrated by arrow 106. As each layer 84 of the workpiece 60 is formed, the build table 92 receives an electric signal 105 from the controller 104 and moves downward by a distance that is substantially equal to the height of the next layer 84. The powder bed 94 is generally formed or produced by the particle spreader or nozzle 96 for each layer 84. The spreader 96 may be a traversing X-Y coordinate gantry spreader. Generally, the powder bed 94 is formed across the entire build table 92 at a substantially consistent thickness with a powder composition that is dictated by the particle separator 98 that is controlled by the controller 104 through electric and/or digital signals 105, and feeds the spreader 96.

Figure 5:
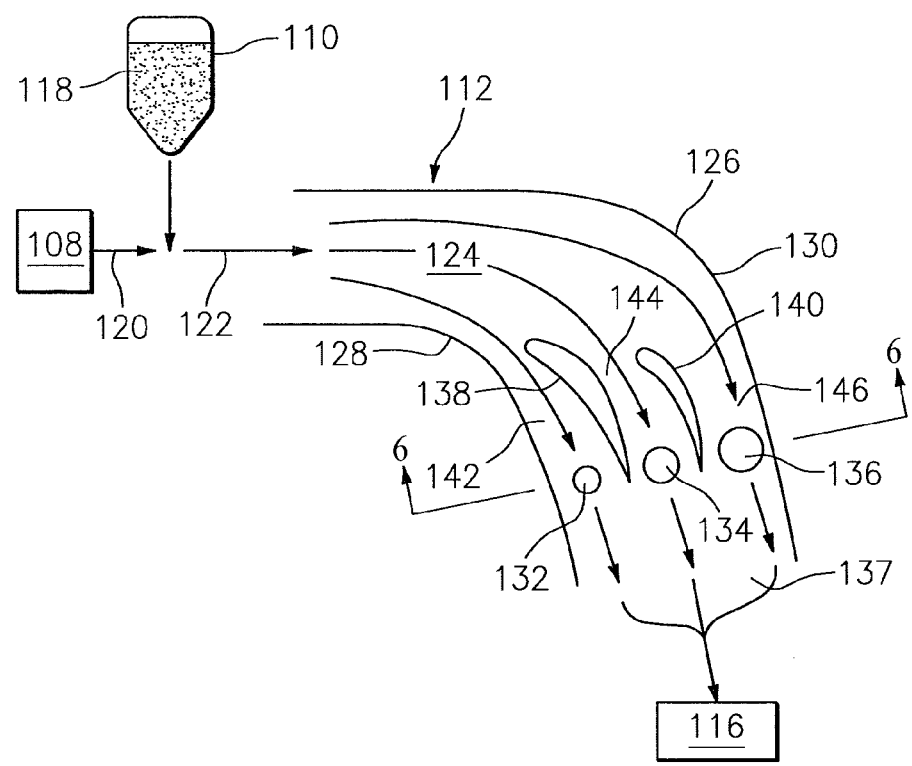
FIG. 5 is a schematic view of an aerodynamic particle separator of the additive manufacturing system.
Figure 6:
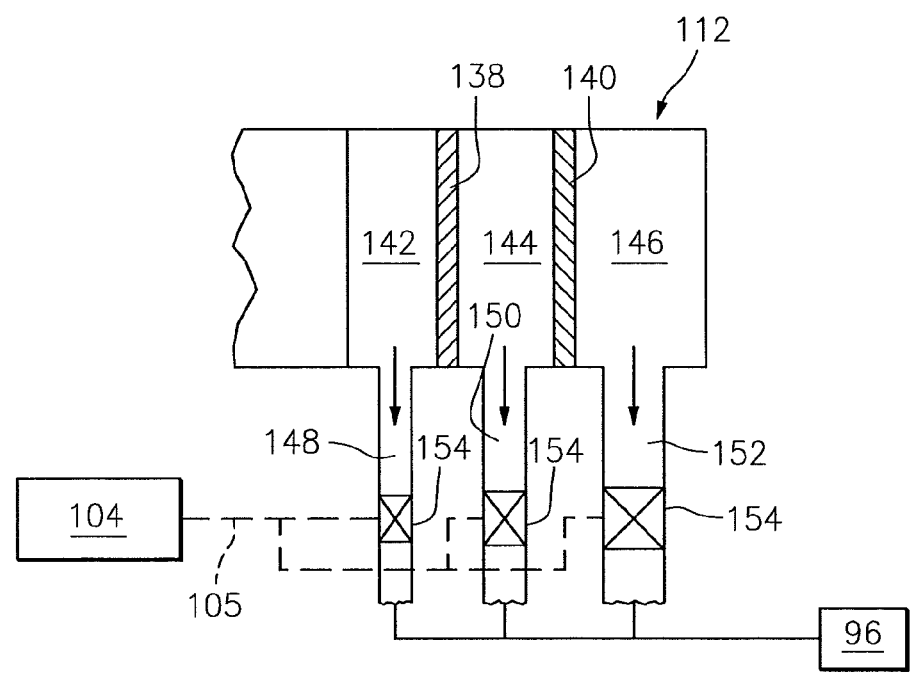
FIG. 6 is a cross section of the aerodynamic particle separator taken along line 6-6 of FIG. 5.

Referring to FIGS. 4 through 6, the aerodynamic particle separator 98 has an air supply device 108, a supply hopper 110, a housing 112, a plurality of offtake conduits 148, 150, 152 (three illustrated as a non-limiting example) and a feed return hopper 116. The air supply device 108 may be an air compressor located in an upstream direction from the supply hopper 110. The hopper 110 contains a mixed powder 118 having a variety of particle types, and is capable of feeding the mixed powder 118 into an airstream (see arrow 120) produced by the air supply device 108. The combined air and powder mixture (see arrow 122) flows through a passage 124 defined by the housing 112. Particle separator 98 operates on the principle that the forces on the particles are due to gravity, drag and inertial forces. While in the housing 112, particles types of the mixed powder 118 are generally separated or categorized by the separator 98. Viscous drag forces are dominant for light particles and low velocities, while inertial forces are dominant for heavier particles and fast velocities. The viscous forces are proportional to the aerodynamic diameter of the particle, and is a function of its size and shape. The particle separator 98 operates on the principle using the ratio of the inertial and viscous forces, thus separating particles in the passage 124 into particle groups or types with low to high inertial to viscous forces ranges by the offtake conduits 148, 150, 152. It is understood and contemplated that the hopper 110 may be any means of supplying a mixed powder into the airflow and may include a piston actuated type device. It is further understood and contemplated that the air supply device 108 may be any device capable of pushing or pulling air through the housing 112 for suspending the powder in the airflow.

To accomplish this particle separation, the passage 124 is generally curved thus the housing 112 has a bend portion 126, an inner wall 128 and an outer wall 130. The inner and outer walls 128, 130 define in-part the passage 124, therebetween, and generally forms the cross sectional contour of the bend. Because the particle types of the mixed powder 118 are entrained in the airstream 120, the particle types of a heavier weight carry more momentum than the particle types of a lighter weight and thus are carried across the airstream in the passage 124 and generally toward the outer wall 130 generally at the bend portion 126. The lighter particle types are less apt to cross the airstream and turn more readily by viscous forces and may thus flow closer to the inner wall 128.

To capture this separation of particle types, two or more offtake holes 132, 134, 136 (three illustrated as a non-limiting example) communicate through the housing 112 and are spaced between the inner and outer walls 128, 130. Each hole 132, 134, 136 is generally located immediately downstream of the bend portion 126 with the first hole 132 being located near the inner wall 128, the second hole 136 located near the outer wall 130 and the third hole 134 located and spaced between the first and second holes 132, 136. Each offtake hole 132, 134, 136 is positioned to accept particles having specific inertial to viscous ratios. For instance, the offtake hole 136 accepts particle types falling within a high ratio range, the hole 132 accepts particles falling within a small ratio range and the hole 134 is positioned to accept particle types having a weight range between the small and high ratio ranges. The offtake conduits may be adjusted to select the desired particle sizes at the desired rates. Any particles not captured by the offtake holes 132, 134, 136 continue to travel through an outlet 137 of the housing 112 and into a feed return hopper 116.

The mixed powder 118 may be homogenous with the particle types being categorized by different particle sizes, or the mixed powder may include particles of different constituents or elements and thus different particle densities. For homogeneous mixed powder, the particle types may have about the same densities but different sizes thus different inertial to viscous ratios. For such homogeneous mixtures, the offtake holes 132, 134, 136 may be sized to accept the varying size of the particle types. That is, the hole 136 near the outer wall 130 may have the largest cross sectional flow area, the mid hole 134 has a medium cross section flow area, and the hole 132 near the inner wall has the smallest cross sectional flow area. For mixed powder 118 of a non-homogeneous composition (e.g. having different constituents to form an alloy), the holes 132, 134, 136 may have substantially equivalent cross sectional flow areas or may be sized such that specific amounts of a particle enter any one hole, or may be sized as described for the homogeneous mixed powder if the density differences between constituents is minimal relative to the size differences between constituents.

The particle separator 98 may further include first and second turning vanes 138, 140 locate in the passage 124, generally at the bend portion 126, and secured to the housing 112. The first vane 138 may be located between and slightly upstream from the first and second holes 132, 134 and with respect to streamlines of the airstream. Similarly, the second vane 140 may be located between and slightly upstream from the second and third holes 134, 136. The vanes 138, 140 generally divide the passage 124 into an inner passage portion 142, a mid passage portion 144, and an outer passage portion 146. The inner passage portion 142 is defined between the first vane 138 and the inner wall 128 and is generally extrapolated or extended upstream through the bend portion 126 and along streamlines The outer passage portion 146 is defined between the second vane 140 and the outer wall 130 and is generally extrapolated or extended upstream through the bend portion 126 and along streamlines The mid passage portion 144 is generally defined between the vanes 138, 140 and is generally extrapolated or extended in an upstream direction through the bend portion 126 and along streamlines between the inner and outer passage portions 142, 146. Each passage portion 142, 144, 146 communicate with respective offtake holes 132, 134, 136.

The vanes 138, 140 may have different turning rates that impact flow field velocities used to induce pressure fields to migrate the particles and thus assist in sorting the particles by promoting the larger and/or heavier particles, with associated momentums, to cross the streamlines of the airstream to the farthest or outer passage portion 146 in the bend. The smallest and/or lighter particle types flow in-line with the streamlines and take the inside path or inner passage portion 142 through the separator 98.

Each offtake hole 132, 134, 136 is associated with the respective offtake conduit 148, 150, 152 orientated substantially perpendicular to the passage 124. A control valve 154 is located in each conduit 148, 150, 152, and may be electromechanical receiving electric signals 105 from the controller 104. The valves 154 move between open and closed positions thus establishing a controlled rate of delivery of each size range and/or weight of particles to the spreader 96. The spreader 96 then remixes the particles from the conduits 148, 150, 152 and distributes the particles onto the build table 92. It is understood and contemplated that although the spreader 96 is illustrated as part of an ALM process, the spreader 96 and particle separator 98 may also be applied to a laser deposition process or similar processes.

In one example the mixed powder 118 particle sizes may range from about ten microns to about sixty microns with a nominal size of about forty microns. The thickness of the powder bed 94 may range from about twenty microns to about one hundred microns. The mixed powder 118 may contain the constituents of Molybdenum, Silicon and Boron. The Molybdenum has the largest particles with the next higher size being Silicon and the finest being Boron.

Figure 7:
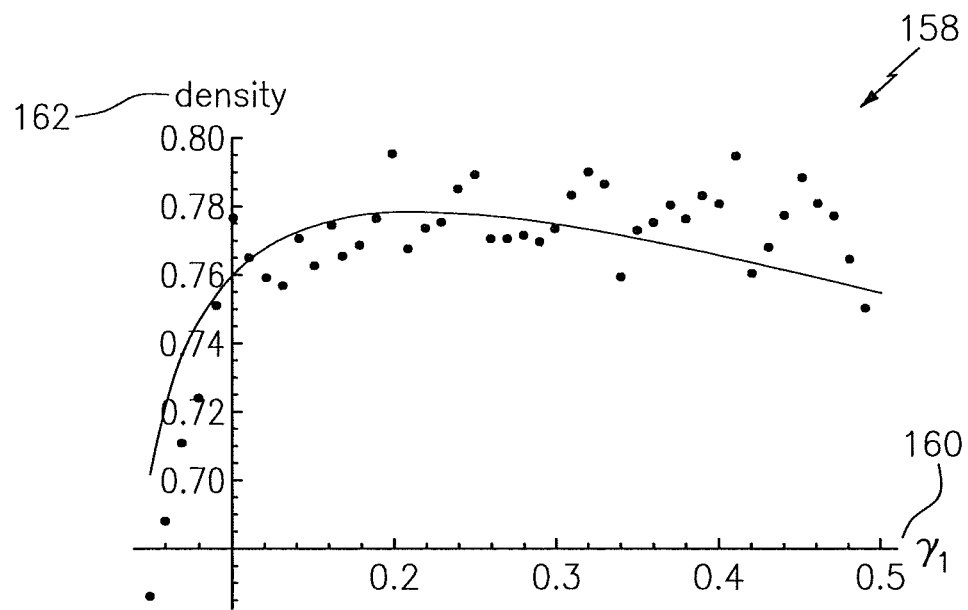
FIG. 7 is a graph of particle size ratios verse packing density.

Referring to FIG. 7, a graph 158 charting particle size ratios 160 verse density 162 is derived from a computational model simulating the effects of "packing ratio" on a long cylinder specimen. (see Shuji Yamada, Jinko Kanno, Miki Miyauchi, Department of Computer Science, Kyoto Japan, Mathematics and Statistics Program, NTT Communication Science Labs, Japan, Jul. 4, 2009 and incorporated herein by reference). The size ratio 160 is generally of large sphere particles divided by small sphere particles with the small sphere particle fixed at about 0.02 microns. From graph 158, it is evident that smaller particle mixes of predominantly smaller sized particles have a denser packing than particle mixes of predominantly larger particles. Therefore, when applied to the AMS 90 and holding other operating parameters (e.g. energy gun power, speed, etc.) substantially constant, a layer 84 of a workpiece 60 (see FIGS. 2 and 8) manufactured of smaller particles of the mixed powder 118 will have a denser composition than a layer 84 of larger particles.

Figure 8:
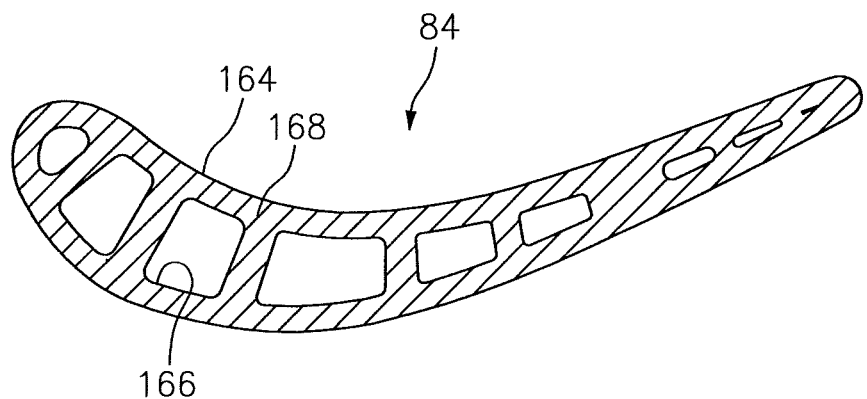
FIG. 8 is a manufacturing layer of the workpiece.
Figure 9:
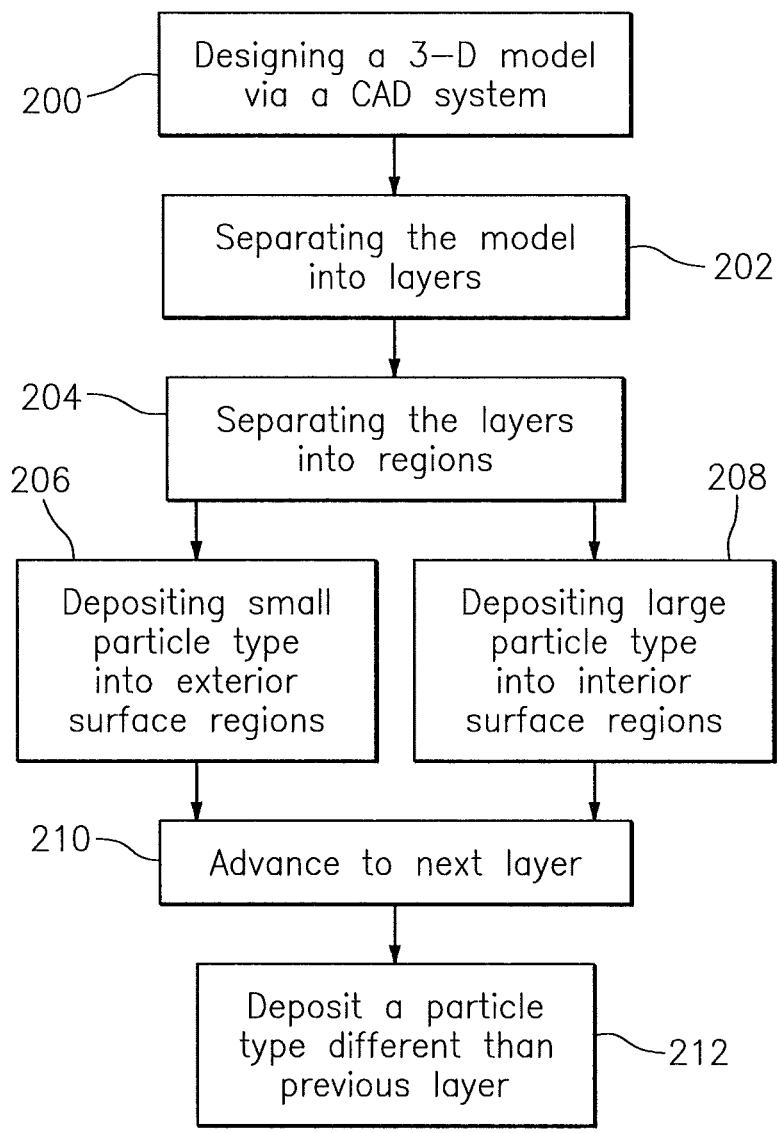
FIG. 9 is a flow chart of a method of manufacturing the workpiece.

Referring to FIGS. 8 and 9, and as a first step 200 of operation, a three-dimensional geometry of a turbine blade 62 (as a non-limiting example of a workpiece) may be designed in a Computer Aided Design (CAD) software system of, or loaded into, the controller 104. This design includes the step 202 of dividing the blade model into stacked layers 84 and step 204 of dividing each layer into pre-specified regions that may include exterior surface regions 164, interior surface regions 166 and mid body regions 168 of each layer 84.

To fabricate the turbine blade 62, the mixed powder 118 is fed from the hopper 110 and into an airstream 120 produced by the air supply device 108 and per electric signals 105 received from the controller 104. The air-and-powder mixture 122 travels through the housing 112 upstream of the bend portion 126 and turning vanes 138, 140. As the mixed powder 118 travels through the passage 124, a momentum is imparted to each particle in the powder. The heavier the weight of the particle type the greater the momentum.

The heavier particle types with the greater momentum are capable of crossing streamlines of the airstream generally at the bend portion 126 of the housing 112. The feed rate of the mixed powder 118, the airstream flow rate or velocity, the turning vane angles and the offtake hole cross section flow areas are all pre-set structurally and/or through the electric signals 105 of the controller 104 to meet pre-specified particle type weight or size ranges that enter the respective offtake holes 132, 134, 136. The mixed powder 118 is thus separated into weight and/or size ranges of particle types with the heavier particles being entrained in the outer or longer passage portion 146, the medium particle ranges in the mid passage portion 144 and the lighter or smaller ranges in the inner or shorter passage portion 142.

The next steps 206, 208 involves the control of the flow of the particle types to the spreader 26 and thus into the exterior surface regions 164, interior surface regions 166, and mid-body regions 168. This is done through the control valves 154 in each conduit 148, 150, 152 and electric signals 105 received from the controller 104. If more of a particle type for any one region of a layer 84 is desired, the control valve 154 associated with that particle type moves further toward the open position, and vice-versa. The spreader 26 then spreads the pre-specified particle types of the mixed powder 118 onto the build table 92. More particularly and as step 206, the spreader may deposit small-sized particle types into the exterior surface regions 164 to achieve a smooth surface finish of the exterior surface 74 of the turbine blade 62. Similarly and as step 208, the spreader may deposit large sized particle types into the interior surface regions 166 for a rough or coarse surface finish of an interior surface 82 of the blade 62. Moreover, the spreader 96 may deposit large-sized particle types into the mid-body regions 168 to speed-up manufacturing. As a non-limiting example, the small-sized particle types may have a small particle ratio that is about ten times smaller than a particle size ratio of the large-sized particle types.

The particle types are then melted on a region-by-region basis by the energy gun 102, the layer 84 solidifies to the previous layer, and as step 210, the bed table 106 is lowered in the z-coordinate direction 106 and the process generally repeats itself for the fabrication of the next layer 84 of the turbine blade 62. As step 212, this next layer may be of a particle type or pattern of particle types that is different from the previous layer. For instance, where the example blade 62 has a smaller density toward the blade tip 68 than the blade root 64, the next layer may be manufactured of a particle type having a larger sphere size to achieve a smaller density.

It is also understood and contemplated that alloy compositions may change (thus constituent percentages may change) from one region and/or layer to the next where different properties are desired. For instance, alloy compositions may change to address stress concerns, heat exposure concerns, weight concerns or cost of material.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A method of operating an additive manufacturing system comprising the steps of:
    selecting a layer of a workpiece;
    separating the layer into a plurality of regions;
    separating a plurality of particle types utilizing a particle separator;
    entraining a mixed powder in an airflow of the particle separator;
    separating the mixed powder into the plurality of particle types by weight ranges;
    depositing one of the plurality of particle types into a respective one of the plurality of regions; and
    melting the regions having the plurality of particle types.

2. The method of operating set forth in claim 1 wherein the region is melted with an energy gun.

3. The method of operating set forth in claim 1 comprising the further step of:
    depositing a first particle type of the plurality of particle types in a first surface region of the plurality of regions for a first surface finish; and
    depositing a second particle type of the plurality of particle types in a second surface region of the plurality of regions for a second surface finish,
    wherein the first particle type is smaller than the second particle type,
    wherein the first surface finish is smoother than the second surface finish, and
    wherein the first surface region is an exterior surface region of the plurality of regions.

4. The method of operating set forth in claim 3, wherein the second surface region is an interior surface region of the plurality of regions.

5. The method of operating set forth in claim 4 wherein the workpiece is an airfoil and the interior surface region defines a cooling channel in the airfoil and the first surface region is an exterior surface of the airfoil.

6. The method of operating set forth in claim 5 wherein the airfoil is a turbine blade.

7. The method of operating set forth in claim 1 comprising the further steps of:
    separately controlling the flow of each one the plurality of particle types into a spreader; and
    controllably dispensing each one of the plurality of particle types onto a build table.

8. The method of operating set forth in claim 7 wherein a laser gun melts the layer.

9. The method of operating set forth in claim 7 wherein an electron beam gun melts the layer.

10. The method of operating set forth in claim 7 wherein the build table is constructed and arranged to move in a z-coordinate direction and the energy gun is constructed and arranged to melt the layer, region-by-region, in an x-y coordinate plane.

11. A method of operating an additive manufacturing system, comprising:
    separating a plurality of particle types utilizing a particle separator;
    entraining a mixed powder in an airflow of the particle separator;
    separating the mixed powder into a plurality of particle types by weight ranges;
    depositing one of the plurality of particle types into a respective one of a plurality of regions of a workpiece; and
    melting a plurality of regions of the workpiece having the plurality of particle types.

12. The method of operating set forth in claim 11 comprising the further steps of:
    depositing a first particle type of the plurality of particle types in a first surface region of the plurality of regions for a first surface finish; and depositing a second particle type of the plurality of particle types in a second surface region of the plurality of regions for a second surface finish, wherein the first particle type is smaller than the second particle type, wherein the first surface finish is smoother than the second surface finish, and wherein the first surface region is an exterior surface region of the plurality of regions.

13. The method of operating set forth in claim 12, wherein the second surface region is an interior surface region of the plurality of regions.

14. The method of operating set forth in claim 11 comprising the further steps of:

separately controlling the flow of each one the plurality of particle types into a spreader; and controllably dispensing each one of the plurality of particle types onto a build table.

* * * * *

UNITED STATES PATENT AND TRADEMARK OFFICE
CERTIFICATE OF CORRECTION

PATENT NO. : 9,932,841 B2
APPLICATION NO. : 15/109001
DATED : April 3, 2018
INVENTOR(S) : Alexander Staroselsky et al.

Page 1 of 1

It is certified that error appears in the above-identified patent and that said Letters Patent is hereby corrected as shown below:

In the Specification

Column 5, Line 26, please delete "foaming" and insert --forming--

Signed and Sealed this
Twelfth Day of June, 2018

Andrei Iancu
*Director of the United States Patent and Trademark Office*